Feb. 14, 1939.　　　　I. W. COX　　　　2,147,245
LOADING COIL CONTAINER
Filed March 7, 1936　　　2 Sheets-Sheet 1
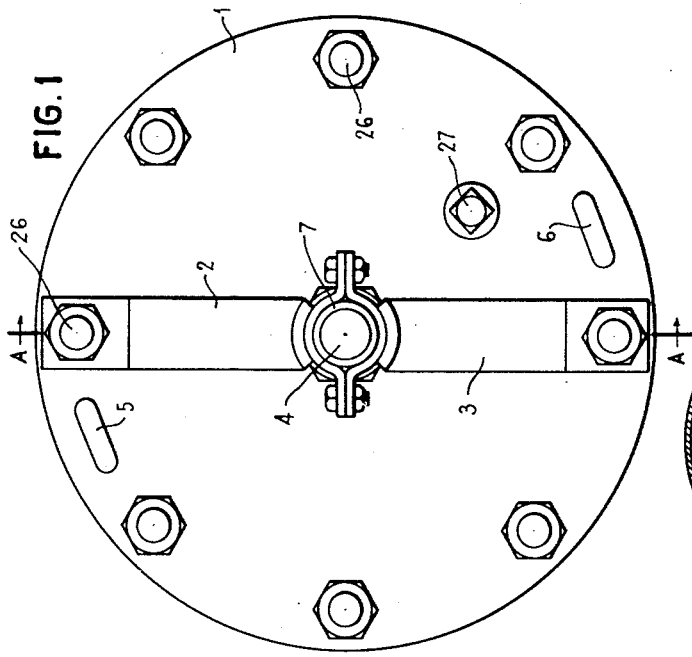
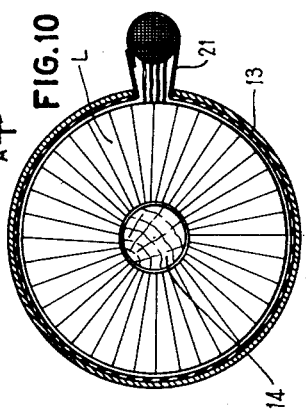
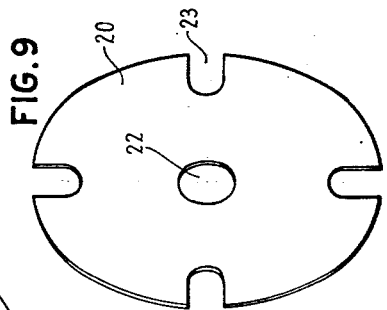
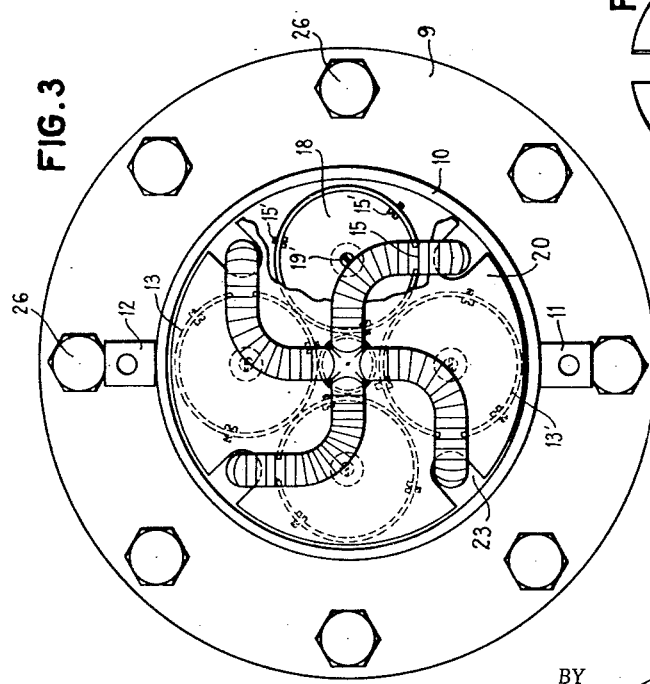
INVENTOR.
IRVIN W. COX
BY
ATTORNEY.

Feb. 14, 1939.   I. W. COX   2,147,245
LOADING COIL CONTAINER
Filed March 7, 1936   2 Sheets-Sheet 2
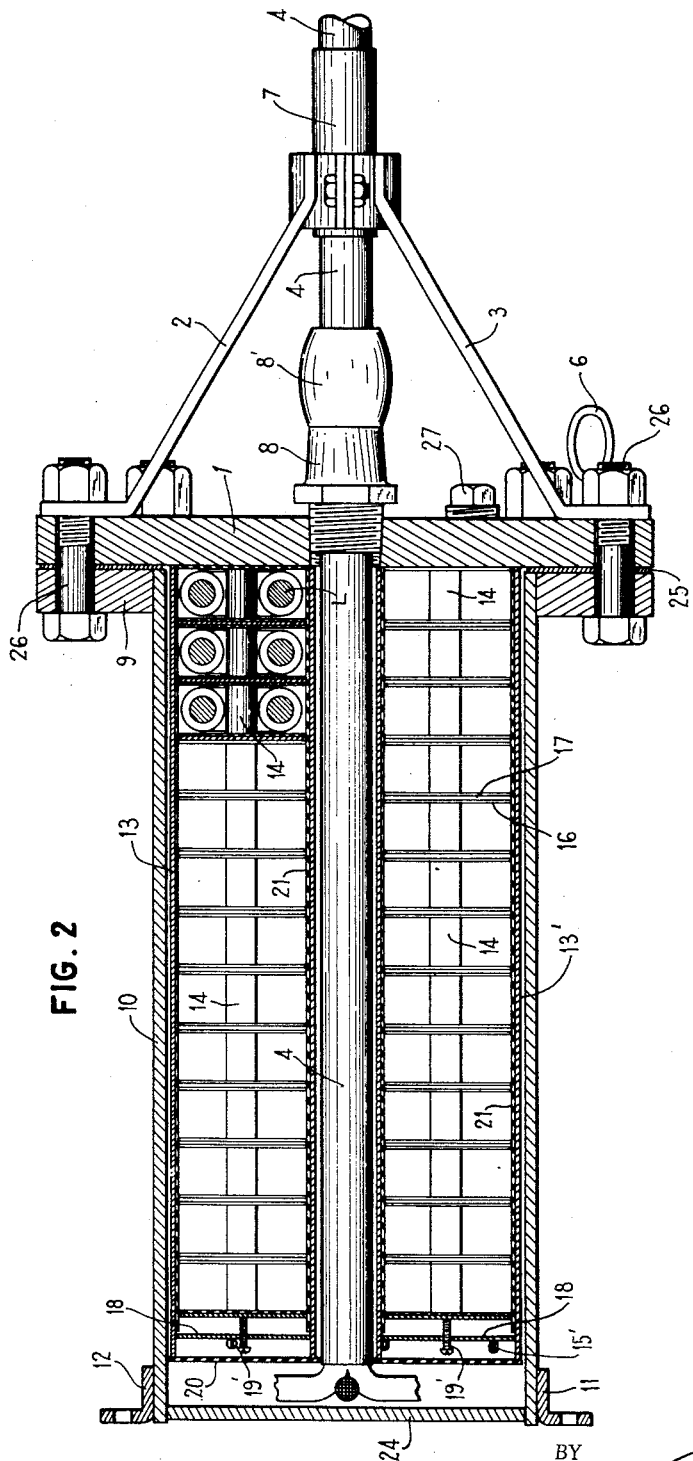
INVENTOR.
IRVIN W. COX
BY
ATTORNEY.

Patented Feb. 14, 1939

2,147,245

UNITED STATES PATENT OFFICE 2,147,245

LOADING COIL CONTAINER

Irvin W. Cox, Chicago, Ill., assignor to Associated Electric Laboratories, Inc., Chicago, Ill., a corporation of Delaware Application March 7, 1936, Serial No. 67,739

5 Claims. (Cl. 178—46)

My invention relates in general to improvements in loading coil containers and more specifically to a metallic case or container for enclosing a plurality of loading coils or the like which are to be included in a transmission line.

In transmission systems it often becomes necessary to locate loading coils in places where space is limited and where they must be protected from surrounding conditions such as dampness or stray magnetic fields. It, therefore, becomes necessary to have the coils enclosed in a case which gives ample protection from such elements and also one which takes up as little space as possible.

I have, therefore, provided a container which not only provides the necessary protection but also facilitates the assembling and wiring of the coils in the case. In the container of my design the coils are stacked in split tubes in such a manner that each coil has a separate enclosure magnetically shielded and separated from the other coils and in which the cable wires may be readily secured to the coils through the slots.

Further features of improvement will be pointed out in the following detailed description of the two sheets of drawings hereto attached in which:

Fig. 1 is a top view of the casing.

Fig. 2 is a sectional view of the casing taken in the direction of the arrows along the line A—A of Fig. 1 except that the cable and brackets on top of the casing are not shown in section.

Fig. 3 is a bottom view of the casing with the bottom plate removed.

Figs. 4-9, inclusive, are views of assembly details and Fig. 10 is an enlarged sectional view of one of the canisters or tubes showing loading coil mounted therein and the connections thereto.

Although I have shown one embodiment of my invention in the accompanying drawings it should be understood that various changes may be made in the specific construction shown without departing from the spirit of my invention. For instance, while the embodiment shown is capable of holding 52 coils, having four canisters or tubes of 13 coil capacity each, the same principles may be applied to a container of different sizes, having only one canister or a greater number.

Referring to the drawings and particularly to Fig. 2, the container has a top plate 1 of wrought iron or the like upon which the other elements are mounted. On the left side of plate 1 (Fig. 2) are mounted four metal tubes or canisters 13, 13', etc., which are spot welded at various points around one end to plate 1. The tube 13 is shown in detail in Fig. 4 and is a split tube of sheet iron with a slot 15 extending throughout its length as shown. The four tubes are welded to plate 1 in the positions shown in Fig. 3 with the slots 15 accessible from the outside and with a space through the center through which the cable may pass. The cable 4 enters through a hole in the center of plate 1 and passes down the center between the canisters so that the free or stub end of the cable lies at the left end of the canisters as shown in Fig. 2. A soldering nipple 8 is threaded into the hole in plate 1 around the cable and a wiped joint is formed at 8' to hold the cable in place.

After the canisters have been welded to plate 1, the coils may be assembled therein as shown. Around the inner wall of each canister is placed a thin sheet of insulation such as 21 which is somewhat wider than the inner circumference of tube 13 and has its two ends projecting from the slot 15 as shown in Fig. 10. In the bottom of each canister is then placed a flat round disc of insulation such as shown in Fig. 2 at 16, which fits snugly within the sheet of insulation 21. The first coil L is next placed in the canister with a wood pin or dowel 14 in the center thereof. These coils L are of the well known doughnut type having a circular metallic core and a winding thereon. The dowels 14 (Fig. 8) are just enough longer than the width of the coils to prevent any pressure being exerted on the coils themselves when stacked. After the first coil is inserted, another disc 16 of insulation is placed on top thereof and then a metal disc 17 which may be of cold rolled steel and of the same size as disc 16. Another disc 16 is then inserted so that between each two coils are two discs of insulation and one of metal. This continues in like sequence until the containers are practically filled. At the end of each canister farthest from plate 1 are three threaded holes 15', two of which are shown in Figs. 2 and 4. After the coils are in the canister and the discs 16 and 17 are placed over the last coil, then a final plate 18 is inserted which has a threaded hole in the center (Fig. 7) carrying an adjusting screw 19' as shown in Fig. 2. Holding screws are now inserted in the holes 15' to act as a back stop for plate 18. Screw 19' may now be tightened down to force the last metal plate 17 away from plate 18 and thus compress the assembled coils and discs together.

Thus each coil is insulated from each other coil and the canister and is completely enclosed in a metallic shell comprising the canister walls and the metal discs 17. The coils are so placed in the canisters that the connecting leads therefrom are adjacent to the slot 15 so that connections thereto can be readily made. After the canisters 13 are all filled with the desired number of coils, then the large insulating disc 20 is placed over the ends to act as a guide for the cable stub ends. The cable comes out through the hole 22 in the center and each of the four stub-ends which are the cable leads to the coils in one canister are turned down through one of the four like notches 23 in the edge of disc 20. This arrangement is clearly shown in Fig. 3. Each stub end of cable may now have its leads easily soldered to the leads from the coils along the slot 15 and after these connections are made the edges of the insulating sheet 21 are turned over around the connected cable stubs as indicated in Fig. 10.

After the coils are completely assembled and soldered to the cable a cover is placed over the canisters and secured to plate 1. This cover comprises a section of water pipe 10 having a flange 9 welded thereto around one end and a plate 24 welded in the other end. A gasket 25 is placed adjacent plate 1 and then the flange 9 is bolted to plate 1 by means of a series of bolts 26 around the circumference as shown in Figs. 1, 2, and 3, to form a completely enclosed case. Brackets 11 and 12 are shown at two sides of the cover for use in mounting.

In order to securely hold the cable 4 in its place and prevent bending or damage thereto I have placed a pair of brackets 2 and 3 under two of the nuts on bolts 26. Each bracket has a clamping member at its outer end which brackets are clamped together over a lead sleeve 7 which covers cable 4 and prevents damage to its sheath. A pair of rings 5 and 6 are also provided in the cover plate 1 for use in handling the case or lowering it into manholes.

In addition I have provided a hole in plate 1 through which insulating compound may be poured, after assembly is completed, to completely seal the whole unit. This hole has a screw plug 27 for closing the hole after impregnation.

It will thus be seen that I have provided a loading coil container in which the assembly of the coils in the canisters or tubes is very easily performed and yet provides for each coil a separate magnetically shielded case of its own to prevent interference between coils and cross talk between different circuits using adjacent coils. Also the split tubes in which the coils are assembled provides a very easy method of connecting the cable wires to the coil leads.

Having thus fully described the features and aspects of my invention what I consider to be novel is pointed out in the appended claims.

What is claimed is:

1. A loading coil case comprising a metallic tube, a series of coils mounted therein each insulated from the other, and each separately enclosed in a metallic box, a slot running lengthwise in said tube, lead wires for the coils extending through said slot, a cable stub for connection with the coils lying adjacent said slot, the lead wires of the coils and the wires of the cable connected together along said slot outside said tube, and a casing for inclosing said tube and cable therein.

2. A loading coil container comprising a metallic head, a series of metal tubes rigidly secured at one end to the head, a cable passing through an opening in said head, a series of loading coils mounted in each tube, a slot extending longitudinally along each tube, each coil placed so that connections thereto may be made through one of the slots, part of the wires of the cable extending along each of said slots and connected to the coils therein, and a casing adapted to be fastened to said head for inclosing said tubes and cables therein.

3. In a loading coil container, a metal head, a series of tubes secured at one end to the head and extending outward therefrom, a slot running lengthwise in each tube, a cable passing through a hole in the head and extending parallel to the tubes and in the center thereof, a series of loading coils mounted in each tube, the leads of said cable being divided at the end of the tube farthest from the head and bent backward toward the head, certain of said leads connected to the coils in each of said tubes through the slots therein, and a casing adapted to be fastened to said head for inclosing said tubes and cables therein.

4. In a loading coil container, a metallic tube having a slot extending the length of the tube, a sheet of insulation around the inside of the tube and having its edges projecting through the slot, a series of loading coils in the tube, a cable extending along the outside of the tube with connections from the wires thereof to the coils through the slots, said sheet of insulation having its edges folded over around the cable to protect the connections.

5. In a loading coil container, a metallic case, a cable entering the case at one end and extending to the other end through the center of the case, a plurality of metallic tubes arranged in a circle around the cable, each tube having a plurality of loading coils therein and a slot thruout its length, said cable having its wires bent back along the outside of the tubes and connected to the coils through said slots.

IRVIN W. COX.